3,142,377
PRESSURE SENSITIVE VINYL TAPE

Jack D. Lulla, Port Chester, and Harvey Wacks, Bronx, N.Y., and Mayer Berliner, Newark, N.J., assignors to Technical Tape Corporation, New Rochelle, N.Y., a corporation of New York
No Drawing. Filed Jan. 30, 1962, Ser. No. 169,958
8 Claims. (Cl. 206—59)

This invention relates to rolls of normally tacky, pressure-sensitive tape comprised of a non-fibrous film backing which is at least predominantly composed of a plasticized vinyl polymer. Such tape is stretchable and retractable and is especially suitable for electrical insulating purposes.

According to United States Patent Re. 23,843 to Oace et al., vinyl tape of the general character described cannot be made successfully unless a combination of two chemically dissimilar kinds of plasticizers is used, one being the conventional monomeric type of plasticizer such as dioctyl pthalate or tricresyl phosphate and the like and the other being a conventional polymeric type of plasticizer such as Paraplex G–25 or Paraplex G–40 (or the like), supplied by Rohm and Haas, Philadelphia, Pennsylvania. Said patent teaches that use of either a monomeric plasticizer alone or a polymeric plasticizer alone results in what hereinafter may be referred to as poisoning of the pressure-sensitive adhesive on the tape backing. Adhesive poisoning may be caused by several factors, including (a) exudation or spewing of plasticizer from the tape backing to the non-adhesive side of the tape thus wetting the adhesive and spoiling its tackiness, (b) migration of plasticizer to the adhesive mass on the tape and causing, in effect, dilution of the adhesive or (c) migration of plasticizers to adhesive with concomitant deleterious chemical action on the adhesive. The Oace patent states that such adhesive poisoning is particularly pronounced whenever there is used (in amounts exceeding 30 parts based on 100 parts of vinyl) either the various monomeric plasticizers alone or the non-migrating polymeric plasticizers alone.

We have now found that vinyl tape of improved characteristics may be made while avoiding the double combination referred to above wherein the polymeric plasticizer comprises the major proportion of the plasticizer mixture. Tapes made according to certain embodiments of our invention exhibit superior flexibility at low temperatures.

According to the invention, vinyl tape of improved properties and commercially free of poisoning of the pressure-sensitive adhesive employed may be made wherein the sole or major proportion of plasticizer in the vinyl film is a monomeric type plasticizer which is the ester reaction product of a multi-hydroxy aliphatic compound such as dipentaerythritol and a monobasic acid such as hexoic or caproic acid and wherein all, or substantially all, the alchoholic hydroxy groups are esterified. A plasticizer of this type is commercially available as Monoplex S–90E from the manufacturer, Rohm and Haas Company, Philadelphia, Pennsylvania. Such plasticizer has a molecular weight of about 800, a low acid number and a viscosity of about 1.5 poises at 25° C. The surprising nature of the discovery is emphasized, insofar as freedom from adhesive poisoning is concerned, when it is noted that Monoplex S–90E is indicated by its manufacturer to exhibit many times the quantity migrating into rubber (after a 7 day test at 60° C.) as is shown in comparable vinyl formulations using a standard polymeric plasticizer alone, such as Paraplex G–25 or G–40. A further factor of significance in tape making, wherein the pressure-sesitive adhesive is commonly coated on the compounded vinyl film while the adhesive is dissolved in a hydrocarbon solvent such as heptane or hexane, is the degree of extraction of the plasticizer therefrom by such solvents from the compounded or plasticized vinyl film. It is noted that vinyl film plasticized only with Monoplex S–90E exhibit substantially the same extraction loss with hexane as do vinyl films plasticized to the same extent with dioctyl phthalate; conversely, the Monoplex S–90E plasticized films exhibit over 40 times the hexane extraction loss as do films plasticized to the same extent with Paraplex G–25 or G–40.

An advantageous feature of the invention lies in the fact that use of a low viscosity plasticizer such as Monoplex S–90E greatly eases or facilitates the compounding and processing of the vinyl film as compared with use of conventional high viscosity polymeric plasticizers alone. Further, the ester reaction product plasticizers typified by Monoplex S–90E appear to exert a synergistic effect on conventional monomeric plasticizers such as dioctyl phthalate or tricresyl phosphate; this permits the successful use of quantities or proportions of such conventional monomeric plasticizers in vinyl tape compositions beyond what has heretofore been indicated in the art as feasible. It will readily be appreciated by those skilled in the art that such synergism permits a wide range of adhesive-stable vinyl tape composition to be designed to meet the requirements of particular end uses. For example, a vinyl tape composition for electrical purposes may need to exhibit a high degree of flexibility at sub-freezing temperatures. In such case when it is desired to employ only monomeric plasticizers, one may use a plasticizer mixture comprised of a major proportion of, for example, Monoplex S–90E and a minor but substantial proportion of dioctyl phthalate; a composition containing a ratio of 35:15 of these plasticizers is suitable.

The features and advantages of the invention can perhaps best be understood by reference to specific examples of vinyl film backings usable in the invention.

The following vinyl film backings have been found to work in vinyl tape compositions according to the invention:

Example I

| | Parts |
|---|---|
| Polyvinyl chloride homopolymer (high molecular weight grade) | 100 |
| Esterified dipentaerythritol (Monoplex S–90E) | 40–60 |
| Lead stabilizer (e.g. Tribase E, National Lead Company, New York, New York) | 6 |
| Flame retardant (e.g. antimony trioxide) | 3 |
| Carbon black | 1–2 |
| Film lubricant or processing aid (e.g. lead stearate) | 0.1 |

To the film backing of Example I there is optionally applied, by conventional tape making technique, a primer coating so as to improve the anchorage of the subsequently applied rubber-resin type pressure sensitive adhesive to the vinyl film backing. A suitable primer is composed of the following approximate ratios in aqueous dispersion:

| | Parts |
|---|---|
| Butadiene-acrylonitrile rubber | 16 |
| Butadiene-styrene resin (high styrene content) | 4 |
| Pentaerythritol ester of hydrogenated rosin (e.g. Pentalyn H, Hercules Powder Co., Wilmington, Delaware) | 60 |
| Neoprene rubber | 20 |
| Total solids | 100 |

After the water has evaporated from the primer coating on the film of Example I, when a primer is used, there is next applied to the film a coating of a pressure sensitive adhesive in conventional amounts and by standard tape making technique. A suitable adhesive with the films described above is composed of the following approximate proportions:

*Example II*

| | Parts |
|---|---|
| Natural rubber | 75 |
| Butadiene-styrene rubber | 25 |
| Rosin type tackifier (hydrogenated rosin ester) | 50 |
| Anti-oxidant | 2 |
| Terpene resin (Piccolyte S 115 of Pennsylvania Industrial Chemical Co.) | 25 |
| Terpene-phenolic resin (SP 553 of Schenectady Resin Co., Schenectady, New York) | 10 |

Solvent (heptane or hexane) to make a solution of about 30% total solids.

While the adhesive of Example II is suitable, other commercially used adhesives for pressure-sensitive tapes such as natural rubber-neoprene or rubber-butadiene-acrylonitrile types or wholly synthetic polymers (e.g. acrylic, vinyl ether copolymers and the like), may also be advantageously employed. In all instances the adhesive coated vinyl sheet after the solvent has evaporated therefrom is made into rolls ready for use.

Where greater low temperature flexibility is desired in the completed tape than can be obtained with the films of Example I, modifications of said film formulations are permissible, as indicated above. However, one may similarly incorporate into the basic film compositions of Example I certain polymeric extenders or modifiers to the extent of about 10 to 25 parts, based on 100 parts of the polyvinyl chloride used, and achieve good low temperature flexibility or other desirable properties while still maintaining adhesive-stability. Among the extenders we have found which may be incorporated directly in the vinyl film as an ingredient thereof but within the limiting proportions stated above are butadiene-acrylonitrile rubber (e.g. Hycar 1014 or 1312 of B. F. Goodrich Co.), chloro-sulfonated polyethylene (e.g. Hypalon LD 220 of E. I. du Pont de Nemours Company), synthetic acrylate resins such as Du Pont's Lucite 44 or Rohm and Haas' KM 228, or even the so-called polymeric plasticizers Rohm and Haas' Paraplexes G-25, G-40 or G-50, Union Carbide's Flexol R-2H or Archer-Daniel-Midland's Admex 761, or the like. One may also use one or more combinations of the above-enumerated polymeric modifiers, provided that the total remains within the above stated range or of about 10 to 25 parts based on 100 parts of vinyl polymer. In certain instances to meet a particular need, one may incorporate mixtures of the indicated polymeric and monomeric plasticizers (in addition to the Monoplex S-90E type used), bearing in mind that based on 100 parts of vinyl polymer, the combination of monomeric plasticizers is always to exceed the quantity of polymeric modifier. One specific example would be a film containing S-90E, dioctyl phthalate and Hycar 1014 in the ratios of 28:12:20. In such instances wherein conventional monomeric and/or polymeric modifiers are substituted for a portion of the S-90E type plasticizer in the film, one may have a total plasticizer content of as high as 70 parts per 100 parts vinyl, instead of the 60 parts indicated as the upper limit in Example I.

Having described various illustrative embodiments of the invention, what is claimed is:

1. A roll of pressure sensitive tape comprising a sheet wound upon itself in roll form, said sheet being coated on a side thereof with a rubber resin type pressure sensitive adhesive and said sheet being comprised of (a) a major proportion of a polymer predominantly consisting of polymerized vinyl chloride, and (b) a non-viscous monomeric liquid plasticizer, said plasticizer being the reaction product of dipentaerythritol and a low molecular weight fatty acid.

2. A roll of pressure sensitive tape comprising a sheet wound upon itself in roll form, said sheet being coated on a side thereof with a rubber resin type pressure sensitive adhesive and said sheet being comprised of (a) a major proportion of a polymer predominantly consisting of polymerized vinyl chloride and (b) a non-viscous monomeric liquid plasticizer, said plasticizer being the esterification reaction product of dipentaerythritol and a $C_5$–$C_6$ monobasic fatty acid.

3. A roll of pressure sensitive tape comprising a sheet wound upon itself in roll form, said sheet being coated on a side thereof with a rubber resin type pressure sensitive adhesive and said sheet being comprised of (a) a major proportion of a polymer predominantly consisting of polymerized vinyl chloride and (b) a non-viscous monomeric liquid plasticizer in amount between about 40 and 60 parts per 100 parts of said polymer, said plasticizer being the esterification reaction product of dipentaerythritol and a $C_5$–$C_6$ monobasic fatty acid.

4. A roll of tape according to claim 2 wherein the hydroxy groups of said dipentaerythritol are substantially fully esterified.

5. A roll of tape according to claim 2 wherein said fatty acid is hexoic acid.

6. A roll of tape according to claim 2 wherein said fatty acid is valeric acid.

7. A roll of tape according to claim 2 wherein said sheet additionally is comprised of a small proportion of a modifier for the vinyl chloride polymer in an amount between about 10 and 30 parts of said modifier per 100 parts of vinyl polymer.

8. A roll of tape according to claim 7 wherein said modifier is selected from the class consisting of butadiene-acrylonitrile rubber, chloro-sulfonated polyethylene, acrylate resins and viscous alkyd resin polymers.

References Cited in the file of this patent

UNITED STATES PATENTS

| 2,672,978 | Hickox | Mar. 23, 1954 |

FOREIGN PATENTS

| 1,200,660 | France | June 29, 1959 |
| 1,227,322 | France | Mar. 7, 1960 |
| 841,910 | Great Britain | July 20, 1960 |